(12) United States Patent
Yasinski et al.

(10) Patent No.: US 10,343,853 B2
(45) Date of Patent: Jul. 9, 2019

(54) CONVEYOR TRANSFER ASSEMBLY

(71) Applicant: Laitram, L.L.C., Harahan, LA (US)

(72) Inventors: Elena Rose Yasinski, Santa Clara, CA (US); Kevin W. Guernsey, Destin, FL (US); Timothy J. DeRoche, Boutte, LA (US); Brian R. Lee, Woodbury, MN (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/980,964

(22) Filed: May 16, 2018

(65) Prior Publication Data

US 2018/0265309 A1 Sep. 20, 2018

Related U.S. Application Data

(63) Continuation of application No. PCT/US2016/063130, filed on Nov. 21, 2016.

(60) Provisional application No. 62/265,245, filed on Dec. 9, 2015.

(51) Int. Cl.
*B65G 47/66* (2006.01)
*B65G 47/84* (2006.01)
*F16H 7/02* (2006.01)

(52) U.S. Cl.
CPC .......... *B65G 47/841* (2013.01); *B65G 47/66* (2013.01); *B65G 47/844* (2013.01); *F16H 7/02* (2013.01)

(58) Field of Classification Search
CPC ....... B65G 47/66; B65G 47/844; B65G 37/00
USPC ............................................ 198/600, 370.02
See application file for complete search history.

(56) References Cited

U.S. PATENT DOCUMENTS

| 2,624,444 | A | | 1/1953 | Casabona |
| 3,853,212 | A | * | 12/1974 | Downes ................. B65G 43/02 198/572 |
| 4,288,208 | A | | 9/1981 | Kusters |
| 4,613,036 | A | | 9/1986 | Bourgeois |
| 5,215,182 | A | | 6/1993 | Garbagnati |
| 5,228,554 | A | | 7/1993 | Kuchta et al. |
| 5,322,158 | A | | 6/1994 | Borsboom et al. |
| 5,597,062 | A | | 1/1997 | Biwer |
| 5,634,550 | A | | 6/1997 | Ensch et al. |
| 5,908,104 | A | | 6/1999 | Brun-Jarret |
| 5,971,129 | A | | 10/1999 | Stawniak et al. |
| 6,068,107 | A | | 5/2000 | Brun-Jarret |

(Continued)

FOREIGN PATENT DOCUMENTS

| JP | H05193728 A | 8/1993 |
| JP | 2008222390 A | 9/2008 |

*Primary Examiner* — James R Bidwell
(74) *Attorney, Agent, or Firm* — James T. Cronvich

(57) ABSTRACT

A conveyor system with a pop-up transfer assembly for transferring articles off the end of conveyor belt having protrusions extending above the belt's outer conveying surface. The transfer assembly is cantilevered over the reversing path of the conveyor belt from a pivot. When a protrusion from the belt hits the transfer assembly, the transfer assembly pivots away from the belt about the pivot. When the protrusion is clear, the transfer assembly drops, by gravity, back to its home position proximate the belt. A bilateral transfer assembly is cantilevered in opposite directions to transfer articles off the end of one conveyor belt onto another conveyor belt that may or may not have protrusions. The transfer assembly can have powered driving surfaces to aid the transfer of articles.

20 Claims, 8 Drawing Sheets

(56) References Cited

U.S. PATENT DOCUMENTS

| | | | |
|---|---|---|---|
| 6,164,435 A | 12/2000 | Coen et al. | |
| 6,296,110 B1 | 10/2001 | van Zijderveld et al. | |
| 6,959,803 B1 * | 11/2005 | Layne ................... | B65G 17/08 |
| | | | 198/600 |
| 7,210,569 B1 | 5/2007 | Tarhan et al. | |
| 7,413,088 B2 | 8/2008 | Temler et al. | |
| 7,506,750 B2 | 3/2009 | Costanzo et al. | |
| 8,210,341 B2 | 7/2012 | Marshall et al. | |
| 8,567,591 B2 | 10/2013 | Gonzalez Alemany et al. | |
| 8,978,871 B1 | 3/2015 | Guider | |
| 9,027,738 B2 | 5/2015 | Coen et al. | |
| 9,452,896 B2 * | 9/2016 | Lee ........................ | B65G 47/66 |
| 2002/0100663 A1 | 8/2002 | MacLachlan | |
| 2005/0016816 A1 * | 1/2005 | Diaz ....................... | B66B 29/08 |
| | | | 198/325 |
| 2005/0173858 A1 | 10/2005 | Temler et al. | |
| 2007/0023257 A1 * | 2/2007 | Schiesser ............... | B65G 47/66 |
| | | | 198/370.04 |
| 2010/0108467 A1 | 5/2010 | Barreyre et al. | |
| 2013/0248322 A1 | 9/2013 | Okamoto et al. | |
| 2014/0008178 A1 | 1/2014 | Guernsey et al. | |
| 2014/0332342 A1 | 11/2014 | Guernsey et al. | |

\* cited by examiner

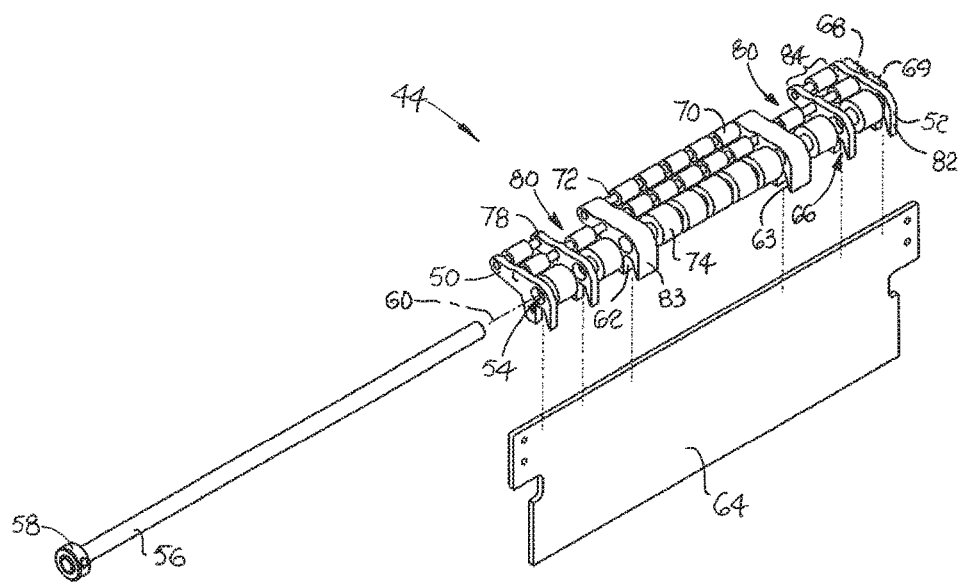
FIG. 2
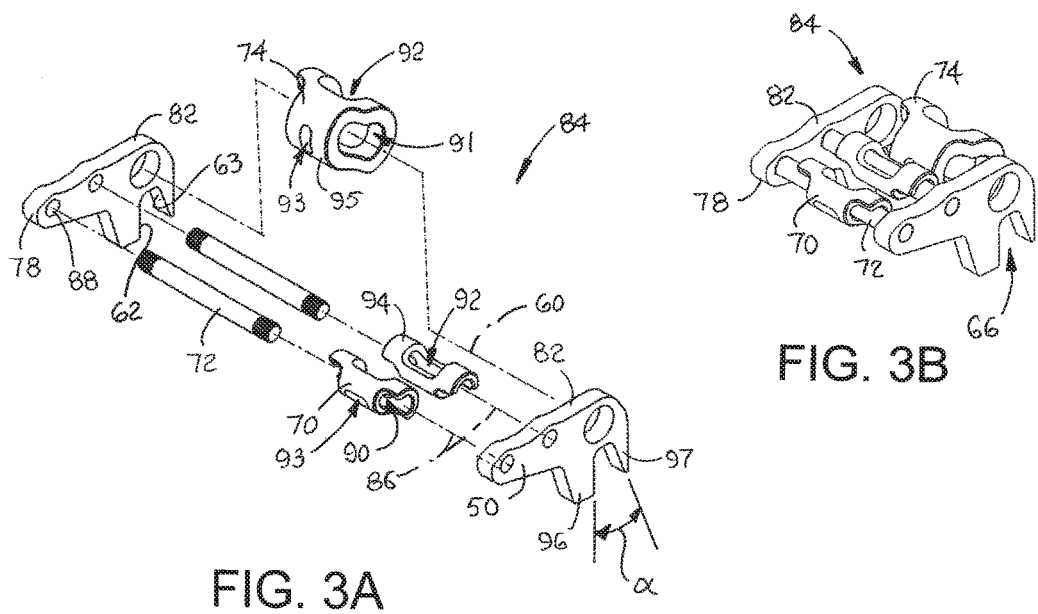
FIG. 3A
FIG. 3B

100; US 10,343,853 B2

CONVEYOR TRANSFER ASSEMBLY

CROSS-REFERENCE TO RELATED APPLICATIONS

This application is a continuation of International Patent Application No. PCT/US2016/063130, filed Nov. 21, 2016, which claims the benefit of U.S. Provisional Patent Application No. 62/265,245, filed Dec. 8, 2015. The disclosures of both those applications are incorporated by reference into this application.

BACKGROUND

The invention relates generally to power-driven conveyors and more particularly to article-transfer assemblies between two end-to-end conveyors.

Shoe sorters are used to divert articles, such as trays or packages, across the conveying surface of a conveyor belt. Shoes riding with the belt move laterally across the width of the belt to push articles off the side or to register them at predetermined positions. The shoes extend from the belt above the conveying surface. Because the shoes protrude above the conveying surface, they require clearance at the end of the belt's carryway run to make their way around drive or idle sprockets. When a conveyor belt is used to feed articles off its end and onto another conveyor, a stationary transfer plate positioned in the space between the two conveyors is commonly used. To prevent articles from tipping over as they enter and exit the transfer plate, especially articles with small footprints or bottom features, the gaps between the transfer plate and the conveyors must be small. But if the shoes of a shoe sorter are not moved to known positions across the width of the belt where clearance is provided by the transfer plate, the shoes will hit the transfer plate and cause damage. In fact, any belt having protrusions, such as flights, is subject to interference by a transfer plate positioned too close to the belt.

SUMMARY

One version of a transfer assembly embodying features of the invention for transferring articles off a conveyor comprises a shaft, a drive coupled to the shaft to rotate the shaft, and a carrier. The carrier includes a pivot portion resting on the shaft to pivot freely about the shaft without enough engagement to rotate with the shaft. A cantilevered portion extends from the pivot portion to a distal tip. A drive surface at the tip supports transferring articles. The shaft is coupled to the drive surface to advance the drive surface as the shaft is rotated by the drive.

Another version of a transfer assembly comprises a pivot portion having a bore and a cantilevered portion extending from the pivot portion to a distal tip. A shaft extending through the bore has a diameter less than the diameter of the bore and defines a pivot axis about which the first pivot portion and the first cantilevered portion are freely pivotable away from a home position when the tip is subjected to an upward force and back to the home position by gravity when the tip is not subjected to an upward force. A first wheel is mounted on the shaft in the pivot portion. A second wheel is rotatably mounted in the cantilevered portion to rotate about an axis parallel to the pivot axis. A drive coupled to the shaft rotates the shaft and the first wheel. A drive belt is trained around the first wheel and the second wheel so that the second wheel rotates with the first wheel.

Yet another version of a transfer assembly comprises a shaft defining a pivot axis and a carrier freely pivotable about the shaft on the pivot axis over an angular pivot range. A first wheel is mounted on the shaft for rotation with the shaft. A second wheel rotatably mounted in the frame rotates on an axis parallel to the pivot axis. A drive coupled to the shaft rotates the shaft and the first wheel. A drive belt is trained around the first wheel and the second wheel so that the second wheel rotates with the first wheel.

BRIEF DESCRIPTION OF THE DRAWINGS

FIG. 2 is an exploded view of the transfer assembly of the conveyor system of FIGS. 1A and 1B;

FIGS. 3A and 3B are exploded and isometric views of a portion of the transfer assembly of FIG. 2;

DETAILED DESCRIPTION

Figure 1A:
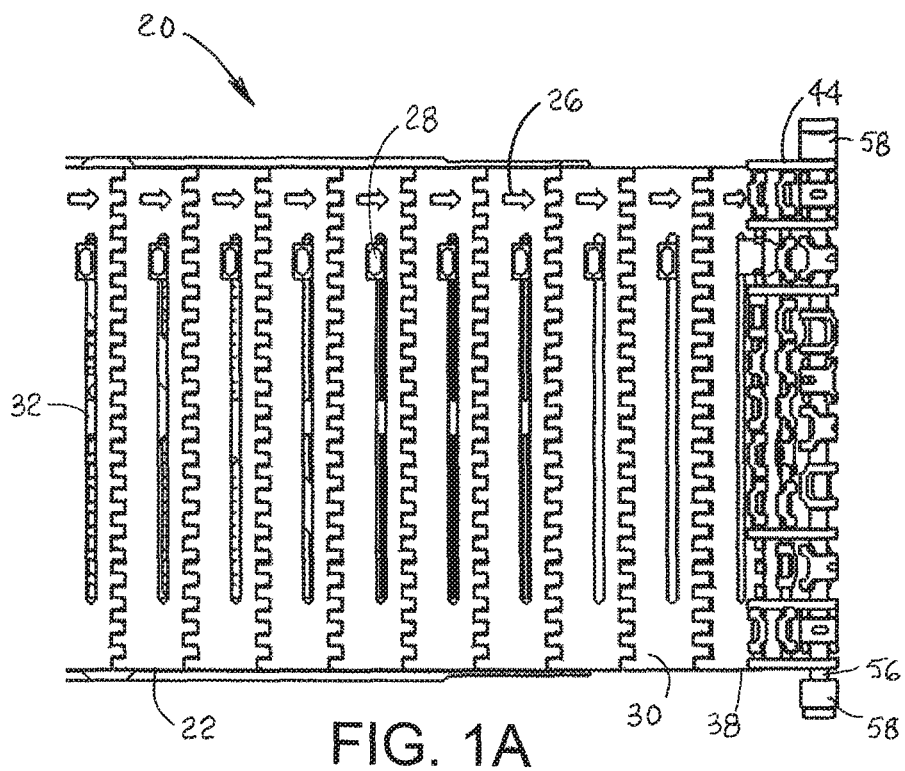
FIGS. 1A and 1B are top plan and side elevation views of a portion of a conveyor system embodying features of the invention.
Figure 1B:
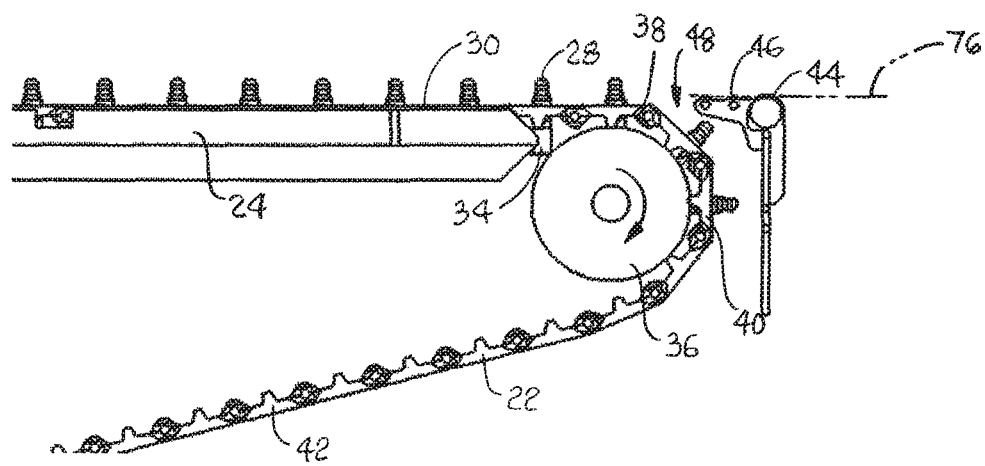

FIGS. 1A and 1B show a portion of a conveyor system embodying features of the invention. The conveying system 20 includes a conveyor belt 22 advancing along a carryway 24 in a conveying direction 26. Protrusions 28 extend outward of an outer conveying surface 30 of the belt 22. In this example, the protrusions 28 are pusher elements that ride along tracks 32 that extend across the width of the conveyor belt 22. Guides (not shown) underlying the belt engage cam followers 34 depending from the pusher elements 28 to guide them across the belt 22 as it advances in the conveying direction 26. Instead of pusher elements, the protrusions could be flights, lane dividers, or any other structure extending upward from a belt's outer conveying surface. The belt 22 departs from the carryway 24 around a reversing element 36, such as drive or idle sprockets, at an exit end 38 of the belt. After following a reversing path 40 around the reversing element, the endless conveyor belt 22 returns in a returnway along a return path 42. Articles not diverted off the belt 22 by the pusher elements 28 transfer off the exit end 38 of the belt onto a transfer assembly 44, whose uppermost surfaces 46 are generally coplanar with the outer conveying surface 30 of the belt on the carryway 24. The transfer assembly 44 is cantilevered over the belt on the reversing element 36 with a small gap 48 between the exit end 38 of the belt and the transfer assembly for a smooth transfer.

The transfer assembly 44 is shown in more detail in FIG. 2. The transfer assembly has a cantilevered portion 50 extending outward from a pivot portion 52. A bore 54 extends laterally through the pivot portion 52. A shaft 56 extends through the bore 54. The shaft 56 is supported at opposite ends in the conveyor frame. The shaft 56 is shown in FIGS. 1A and 2 mounted in bearing blocks 58 so that it can rotate, but it could be affixed at both ends so as not to rotate. In this example the inner diameter of the bore 54 is greater than the outer diameter of the shaft 56 so that the transfer assembly 44 can rotate about the shaft on a pivot axis 60 defined by the shaft perpendicular to the conveying direction 26. Because of the slightly oversized bore 54, the pivot axis of the transfer assembly is offset slightly from the shaft's actual pivot axis 60. Stop faces 62, 63 on the transfer assembly 44 operate in conjunction with a fixed stop, such as a stationary plate 64, that extends into a space 66 between the stops to limit the angular pivot range of the transfer assembly about the pivot axis 60.

As shown in FIG. 2, the transfer assembly 44 includes two rows 68, 69 of small-diameter wheels, or rollers 70, mounted on connecting members 72 in the form of connecting pins parallel to the pivot axis 60. Large wheels, or rollers 74, are mounted on the pivot shaft 56. The bore 54 is below the level of the connecting pins 72 so that the large rollers and the small rollers have a common tangent plane 76, as shown in FIG. 1B. The tangent plane 76 is generally coplanar with the outer conveying surface 30 of the conveyor belt 22. Articles transferring off the exit end 38 of the conveyor belt 22 ride across the freely rotatable rollers 70, 74 in the transfer assembly 44. The first row 68 of rollers 70 is positioned close to a distal tip end 78 of the cantilevered position 50, as shown in FIG. 2. The second row 69 of small rollers 70 is positioned between the first row 68 and the row of large rollers 74 on the pivot shaft 56. The first row 68 of rollers 70 is shown interrupted by spaces 80 at predetermined positions across the width of the transfer assembly 44. The spaces define vacant roller positions in the first row 68 that provide clearance for the belt's protrusions 28 when they are positioned to pass through the openings as the belt 22 enters the reversing path 40 around the reversing element 36. But if the protrusions 28 are not in these positions, they encounter the distal tips 78 of the transfer assembly 44.

As shown in FIG. 2, the transfer assembly 44 comprises a series of laterally spaced apart side rails: thin rails 82 and thick rails 83. The connecting members 72 connect consecutive side rails 82, 83 so that consecutive side rails pivot together about the pivot axis 60. In the example shown, the connecting members 72 are the connecting pins on which the small-diameter rollers 70 are mounted. Pairs of consecutive side rails 82, 83 form cradles or carriers 84 for the rollers. Each carrier can support one or more small rollers 70 on each connecting pin 72 and one or more large rollers on the portion of the shaft 56 between the carrier's side rails.

One of the carriers 84 is shown in more detail in FIGS. 3A and 3B. The carrier 84 in this example has only one small roller 70 on each pin 72 and only one large roller 74 for mounting on the pivot shaft. The cantilevered fingers 50 extend outward from the pivot portions 52 of the side rails 82. The fingers terminate in the curved distal finger tips 78. The small rollers 70 are mounted on the connecting pins 72 for free rotation about the axes 86 of the pins, which are parallel to the pivot axis 60. The ends of the pins 72 are knurled and press-fitted into cavities 88 in the side rails 82. The small and large rollers 70, 74 have central bores 90, 91 that receive the pins 72 or the shaft 56. Openings 92, 93 in the peripheries 94, 95 of the rollers extend to the central bores 90, 91 to improve the cleanability of the rollers. Besides exposing more of the bore and the pins and the shaft, the radial surfaces of the openings 92, 93 act like the vanes of a water wheel and cause the rollers to rotate when subjected to a stream of water or cleaning fluid. The rotation of the rollers further exposes the pins and shafts to the cleaning fluid. Two tabs 96, 97 depend downward from each side rail 82. The tabs have two confronting stop faces 62, 63 separated by the space 66. The stop faces 62, 63 are formed along radial extensions from the pivot axis 60 and define an angular pivot range a of the carrier 84 about its pivot axis 60. The angular pivot range a shown in FIG. 3A is only approximate because it does not account for the thickness of the fixed plate 64, which decreases the actual pivot range of the carrier 84, as better shown in FIG. 4C.

Figure 4A:
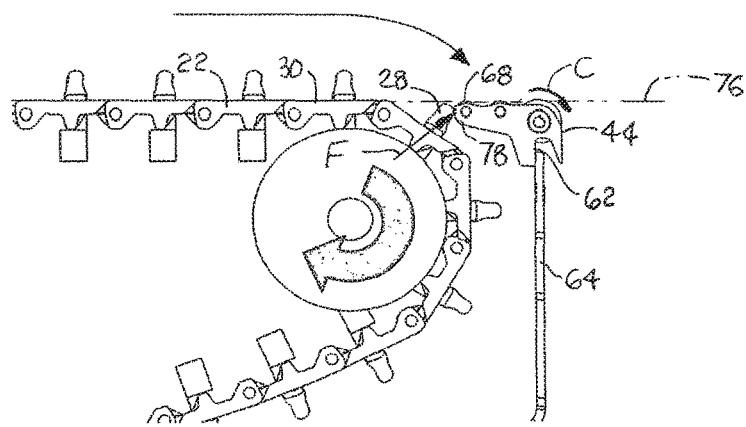
FIGS. 4A-4C are sequential side elevation views of the transfer assembly of FIG. 2 shown popping up upon contact with a belt protrusion and returning to a home position.
Figure 4B:
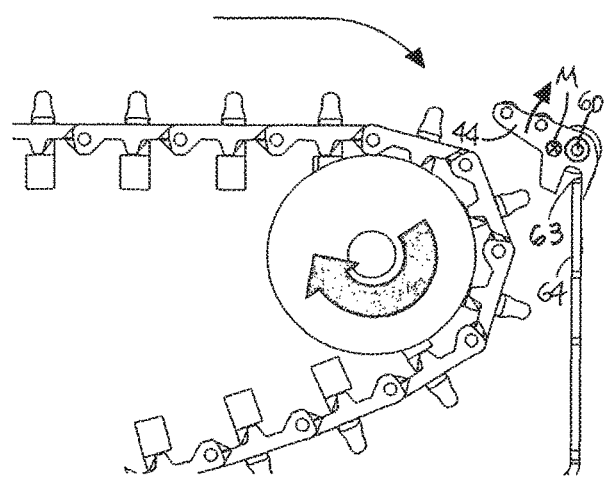
Figure 4C:
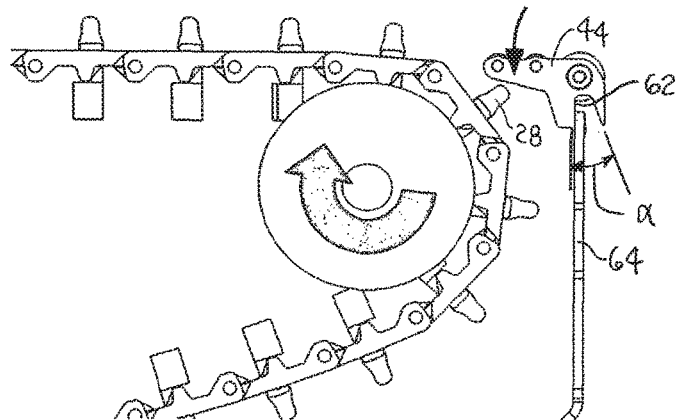

When a belt protrusion 28 is not aligned with one of the vacant roller spaces 80 as it starts to round the reversing element 36, it hits the distal tip 78 or the first row of rollers 68 of the transfer assembly 44, as shown in FIG. 4A. Contact between the protrusion 28 and the curved distal tip 78 of the transfer assembly 44 exerts a force F against the tip. The force F has an upward component that produces a couple C about the pivot axis that pivots the transfer assembly 44 clockwise from a home position shown in FIG. 4A with the first stop face 62 against the stop 64 to a popped-up position in which the first stop face is out of contact with the stop. FIG. 4B shows the transfer assembly 44 pivoted to a maximally pivoted popped-up position in which the second stop face 63 contacts the fixed stop 64. The stop 64 is attached to the conveyor frame at a fixed position relative to the stop faces 62, 63 so that the tangent plane 76 of the rollers 70, 74 is generally coplanar with the outer conveying surface 30 of the belt when the transfer assembly is in the home position (FIG. 4A). When the transfer assembly 44 is at the maximally popped-up position with the second stop face 63 contacting the stop 64, the center of mass M of the pivoting portion of the transfer assembly is on the belt side of the pivot axis 60 (FIG. 4B). In this way the transfer assembly can pivot counterclockwise, as in FIG. 4C, in the absence of an upward component of force from a protrusion and by the force of gravity back to the home position with the first stop face 62 in contact with the stationary stop 64. Thus, the transfer assembly pops up out of the way of the protrusions 28 as soon as they hit and returns home as soon as they pass.

Figure 5A:
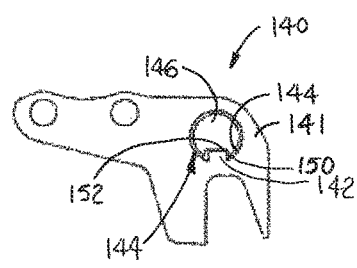
FIGS. 5A and 5B are side elevation views of another version of transfer assembly embodying features of the invention including a grooved-shaft stop mechanism and shown in home and popped-up positions.
Figure 5B:
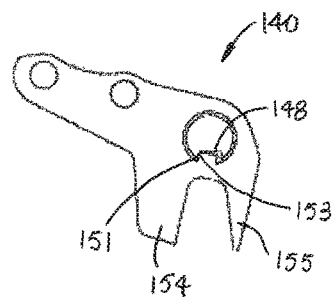

FIGS. 5A and 5B show another version of a transfer assembly in home and maximally popped-up positions. The transfer assembly 140 has a pivot portion 141 with a tab 142 that extends into the pivot bore 144 from a bore wall 144. A pivot shaft 146 received in the bore 144 has a groove 148 that accommodates the tab 142. A trailing stop face 150 at one end of the tab 142 contacts an aft end face 152 of the groove 148 to define the home position of the transfer assembly as shown in FIG. 5A. A leading stop face 151 at the other end of the tab 142 contacts a forward end face 153 circumferentially spaced from the aft end face 152 of the groove to define the maximally popped-up position of the transfer assembly as shown in FIG. 5B. Thus, the aft and forward end faces 152, 153 of the groove act as stops limiting the angular pivot range of the transfer assembly 140. The circumferential extents of the groove 148 and the tab 142 determine the angular pivot range. The transfer assembly 140 is also shown with tabs 154, 155 like those 96, 97 in the transfer assembly of FIG. 3A. So the transfer assembly 140 of FIGS. 5A and 5B is adaptable for use with either the grooved shaft 146 or the fixed plate 64 to limit the angular pivot range. Of course, another version without the depending tabs 154, 155 is also possible.

Figure 6:
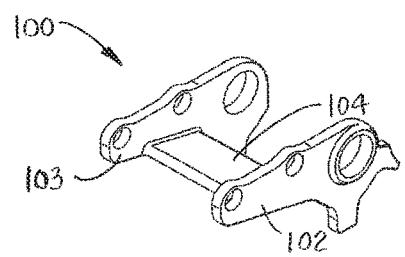
FIG. 6 is an isometric view of one version of a roller carrier usable in a transfer assembly as in FIG. 2.

A monolithic carrier 100 is shown in FIG. 6 with rollers and connecting pins removed for clarity. The monolithic carrier 100 has facing side rails 102, 103 connected by an integral connecting member 104, or cross beam, in the form of a flat strip. The monolithic carrier is molded or machined as a single piece.

Figure 7:
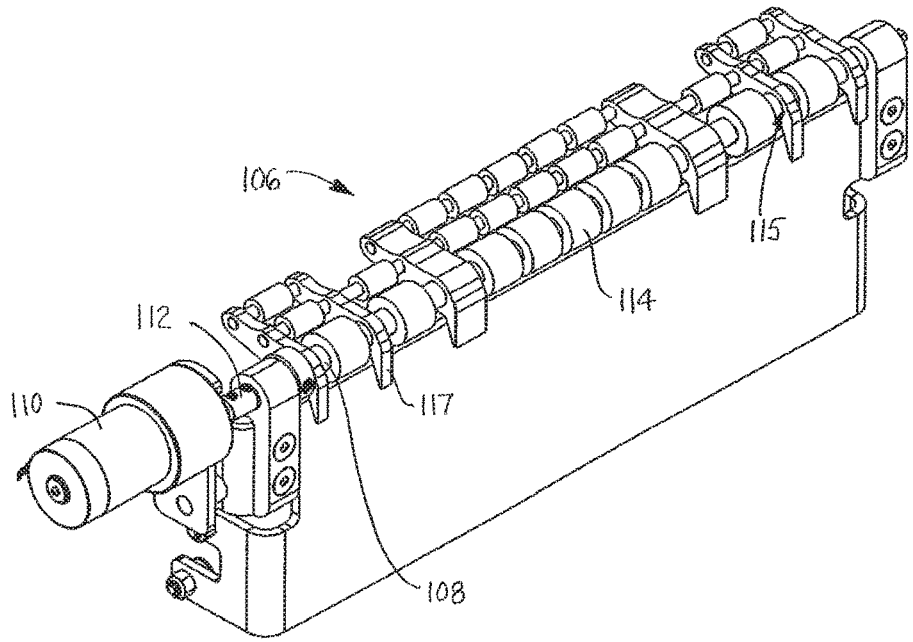
FIG. 7 is an isometric view of another version of a pop-up transfer assembly usable in a conveyor system as in FIG. 1, including a motor-driven pivot shaft.

Another version of a transfer assembly is shown in FIG. 7. The transfer assembly 106 shown is identical to that of FIG. 2, except that the pivot shaft 108 is not passive, but driven. A motor 110 coupled to the shaft 108 by a coupling 112 rotates the large rollers 114, which are snugly received on the shaft, such as by a press fit. The driven large rollers 114 help transfer articles over the transfer assembly 106 and are especially useful in preventing articles from being stranded on the transfer assembly when the feeding conveyor is halted. The bores 115 through the side rails 117 are large enough to allow the carrier, resting on the shaft, to pivot freely about the pivot shaft 108 without being rotated by the shaft.

Figure 8A:
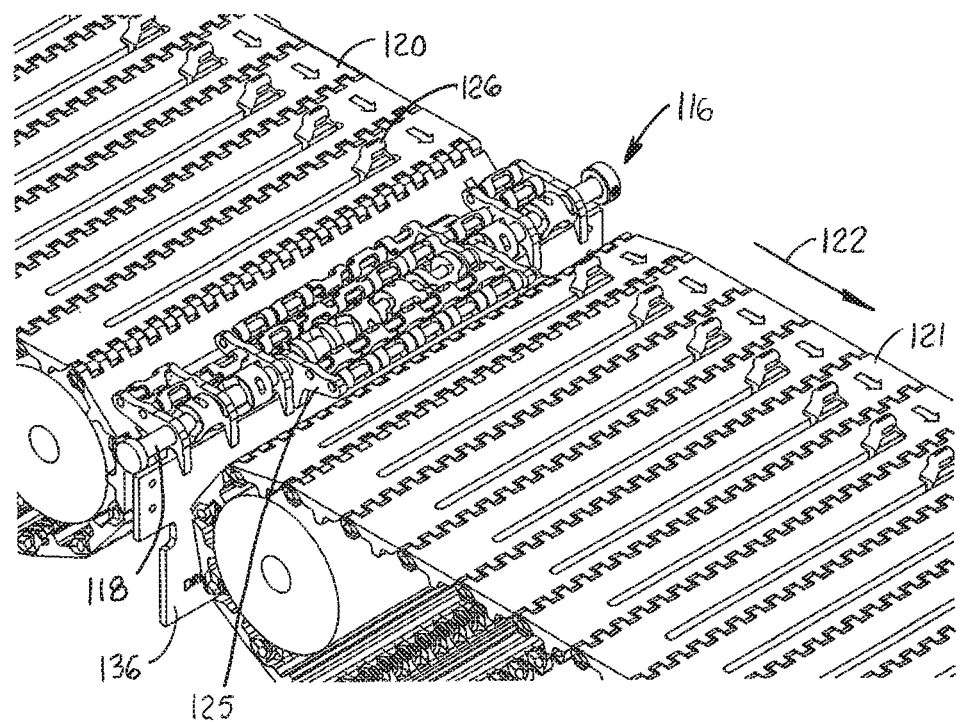
FIGS. 8A and 8B are isometric and side elevation views of a bilateral transfer assembly between two conveyors.
Figure 8B:
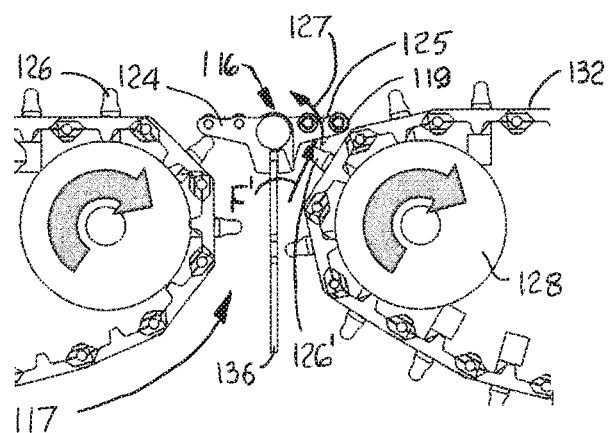

A bilateral transfer assembly 116 is shown in FIGS. 8A and 8B. The transfer assembly 116 has oppositely directed carriers pivotally attached to a pivot shaft 118. The bilateral transfer assembly 116 is positioned in a space 117 between the exit end of an upstream conveyor belt 120 and the entrance end of a downstream conveyor belt 121 both advancing in the same conveying direction 122. An upstream portion 124 of the bilateral transfer assembly 116 is shown in this example as the same as the unilateral transfer assembly 44 of FIG. 2. The upstream portion 124 and a downstream portion 125 are disposed back to back on the pivot shaft 118 with the distal ends of each distal tip 119 of the downstream portion 125 extending away from the pivot portion of the upstream portion 124. The downstream portion 125 is similar, but is shown having fewer rollers and carriers than the upstream portion 124 has. But, depending on the application, the downstream portion 125 could have the same number of or more carriers and rollers. The upstream portion 124 cooperates with the upstream belt 120 and its protrusions 126 as described for the unilateral transfer assembly 44 in reference to FIGS. 4A-4C. The downstream portion 125 of the bilateral transfer assembly 116 pivots counterclockwise 127 in FIG. 8B about the pivot shaft 118 when struck from below by a protrusion 126' rounding a reversing element, such as an idle sprocket set 128. An upward force F' from the protrusion 126' pops the downstream portion up away from the downstream conveyor belt 132. After the popped-up downstream portion 125 is cleared by the protrusion 126', gravity pivots the downstream portion of the transfer assembly back into its home position in line with the top conveying surface 132 of the downstream conveyor belt. Like the upstream portion 124, the downstream portion 125 has tab stop faces that cooperate with a stationary stop 136 affixed to the conveyor frame to limit the pivot range of the carriers.

Figure 9:
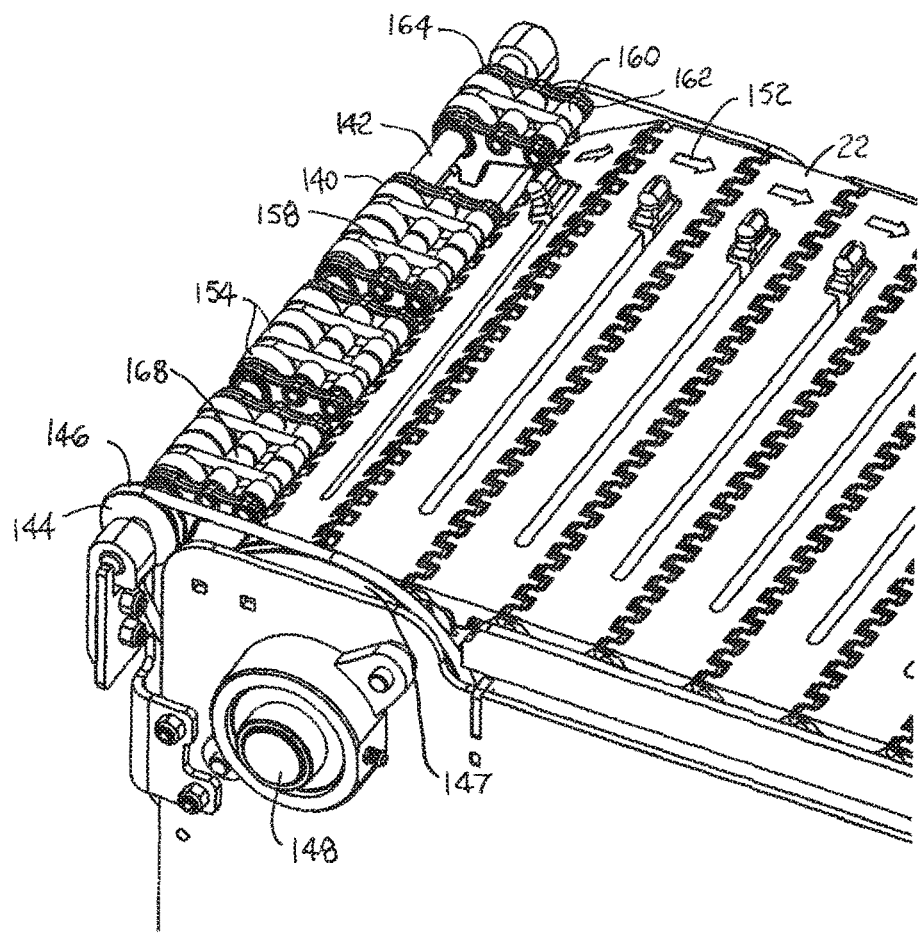
FIG. 9 is an isometric view of a portion of a conveyor system as in FIG. 1 with a powered transfer assembly driven by a slave drive.
Figure 10:
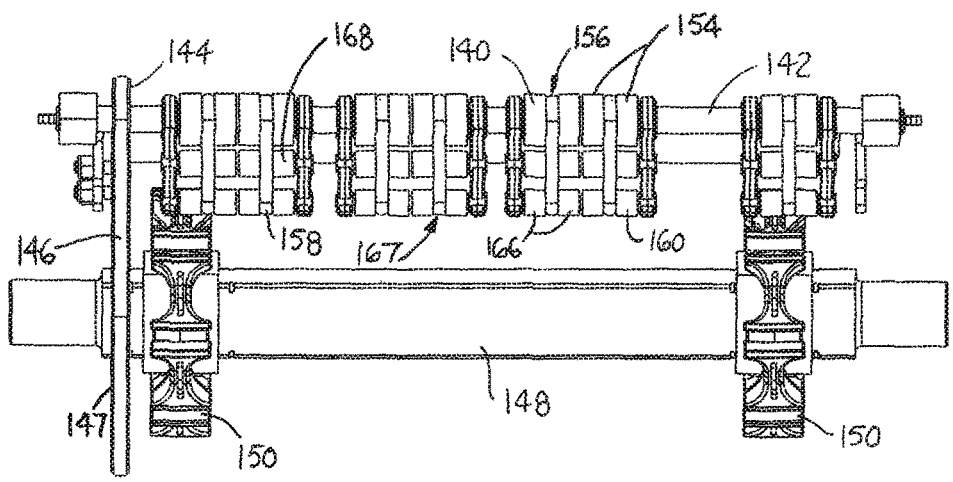
FIG. 10 is a top plan view of the transfer assembly and drive system of the conveyor system of FIG. 9 with the conveyor belt removed for clarity.

Another version of a transfer assembly with powered wheels, or rollers, is shown in FIGS. 9 and 10. In this version, the large wheels 140 affixed to the shaft 142 are driven by a slave pulley 144 on the shaft. A belt 146 connects the slave pulley 144 to a master pulley 147 affixed to a drive shaft 148 or an idle shaft for the conveyor belt 22. Reversing wheels, such as pulleys, drums, or sprockets 150, on the drive shaft 148 engage the underside of the conveyor belt 22 and drive it in a direction of belt travel 152 on an upper run and reverse its direction for its lower return run. The drive shaft is driven by a motor (not shown). If the shaft is an idle shaft, it is rotated by engagement with the conveyor belt 22. The rotation of the drive shaft 148 rotates the master pulley 147. The slave pulley 144 is, in turn, belt-driven from the master pulley 147. The slave pulley 144 rotates the transfer assembly's shaft 142 and the large wheels 140 affixed to it. The large wheels 140 have large-diameter outer portions 154 flanking a small-diameter portion 156 forming a groove in the middle of each large wheel. A drive belt 158, such as a round belt, is received in the groove and extends to a smaller wheel 160 at the cantilevered tip 162 of the carrier 164. Like the large wheel 140, the small wheel 160 has both large- and small-diameter portions 166, 167 forming a groove for the drive belt 158. So the shaft 142 rotates the large wheels 140, which rotate the small wheels 160 at the tip 162 via the drive belt 158 and aid in the transfer of articles across the transfer assembly. The small wheels 168 in the second row between the row of outermost tip-end small wheels 160 and the large shaft-mounted wheels 140 also have grooves to accommodate the passage of the drive belt 158. But there will be no more than incidental contact between the drive belt 158 and the intermediate wheels 168. So the intermediate wheels 168 are essentially idle wheels. And the carrier 164 is merely supported by the shaft 142 and not driven by it. For the tangential speed of the outermost small wheels 160 to equal the tangential speed of the large wheels 140, the ratio of each wheel's large diameter $D_i$ to its small diameter $d_i$ (at the groove) must be the same ($D_1/d_1=D_2/d_2$)—under conditions of no drive-belt slip. So that articles do not abrade the drive belts 158, their diameters are less than the depth of the grooves in the wheels 140, 160. The wheels 140, 160 provide drive surfaces for articles because the drive belts 158 are recessed inward of the wheels' outer peripheries.

Figure 11:
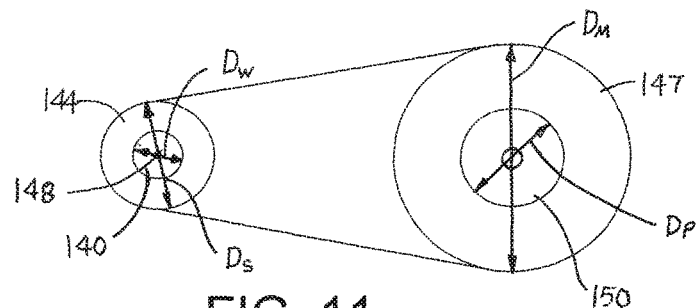
FIG. 11 is a schematic of the slave drive and its master belt drive.

The tangential speed of the transfer wheels is set relative to the belt speed in the slave drive by the relationship of the diameters of the sprocket, the pulleys, and the wheels. The tangential speed of the large transfer-assembly wheels 140 will equal the belt speed if the ratio of the diameter $D_M$ of the master pulley 147 to the diameter $D_P$ of the sprockets 150 equals the ratio of the diameter of the slave pulley $D_S$ to the diameter $D_W$ of the large wheels 140 on the shaft 148; i.e., $D_M/D_P=D_S/D_W$, as shown in FIG. 11. The diameter $D_P$ of the sprocket, as used here, is twice the radius measured from the axial center of the sprockets to the outer surface of the conveyor belt. The relative speeds can be changed by changing these ratios, which causes the transfer assembly to accelerate or decelerate the articles.

In the transfer assembly shown in FIGS. 9 and 10, articles ride directly atop the outer peripheries of the wheels 140, 160, 168. In the version shown in FIGS. 12 and 13, articles ride atop drive belts 170 trained around large and small wheels 172, 174. The drive belts 170 provide a drive surface to transferring articles. The large wheels 172 are affixed to the powered shaft 142. The small wheels 174 at the tip end 176 of the carriers 177 are arranged to rotate on a connecting pin 178. Both sets of wheels 172, 174 are configured as pulleys, or sheaves, with the drive belts 170 in the pulley grooves. The large wheel 172 is a drive pulley, and the smaller wheel 174 is an idler pulley. The diameter of the drive belt 170 is greater than the depth of the grooves. The grooves are shallow enough so that articles transfer atop the drive belts 170 driven by the shaft 142 and drive pulleys 172. For speed matching the drive belts 170 in this version to the conveyor belt using the ratios described in the previous paragraph, the $D_W$ to use is twice the radius measured from the axial center of the large wheels 172 to the outer surfaces of the drive belts, which may be round belts or V-belts, for example.

FIGS. 14-17 show versions of roller carriers in which the shaft is used to drive the drive belt directly without an intervening large wheel. The carrier 180 in FIG. 14 has small tip-end wheels 160 like those in FIGS. 9 and 10. A rotatable shaft 182 extends through the slightly oversized bores in the carrier. The shaft 182 has grooves 184 in which a drive belt 186 is received. The drive belt 186 is trained around the shaft 182 and the wheel 160 so that the wheel is rotated by the slave- or motor-driven shaft. In this version, because the diameter of the drive belt 186 is less than the depth of the shaft's groove 184, articles are supported mainly on the drive surfaces provided by the tip-end wheels 160 and the shaft 182.

Figure 14:
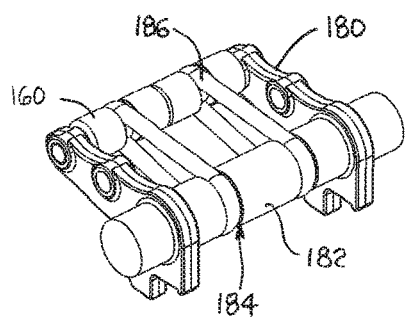
FIG. 14 is an isometric view of another version of a carrier usable in a transfer assembly as in FIG. 9 in which the drive belt is driven directly off the shaft.
Figure 15:
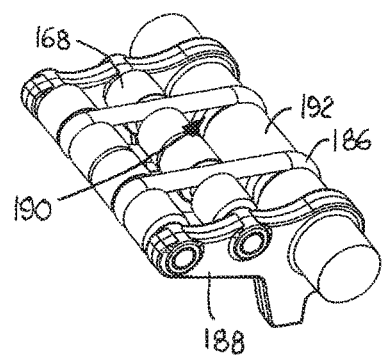
FIG. 15 is an isometric view of an alternative version of the carrier of FIG. 14.

The carrier 188 in FIG. 15 is similar to that of FIG. 14, except that the carrier is shown with a row of intermediate idle wheels 168, as in FIG. 9, and the diameter, or thickness, of the drive belt 186 is greater than the depth of the groove 190 in the rotatable shaft 192. In this way articles contact the drive surfaces provided by the drive belt 186 rather than the metal shaft 192 as they transfer over the carrier 188.

Figure 12:
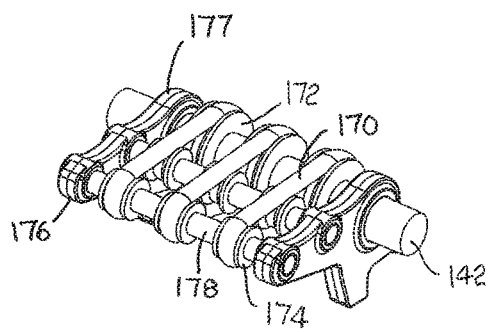
FIG. 12 is an isometric view of another version of a carrier usable in the transfer assembly of FIG. 9 using pulley wheels instead of roller wheels.
Figure 13:
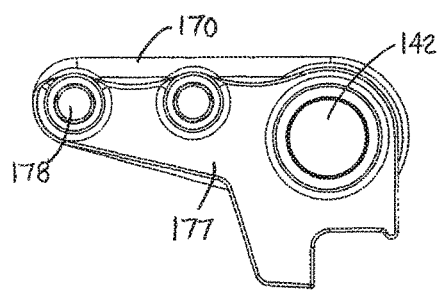
FIG. 13 is an enlarged side elevation view of the carrier of FIG. 12.
Figure 16:
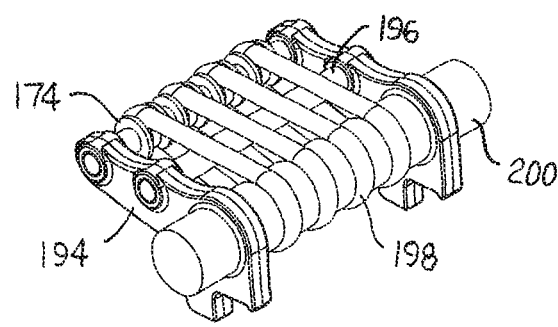
FIG. 16 is an isometric view of another version of a carrier usable in a transfer assembly as in FIG. 9.

FIG. 16 shows a carrier 194 in which the tip-end wheels are pulleys 174 as in FIG. 12. And unlike in FIG. 12, the intermediate connecting pin 196 does not include idle wheels. Furthermore, the drive belt 198 is shown wrapped around the periphery of a rotatable shaft 200 without grooves. So, in this version, articles transfer across the carrier on the drive surfaces provided by the drive belt 198 without contacting the shaft 200 or the wheels 174.

Figure 17:
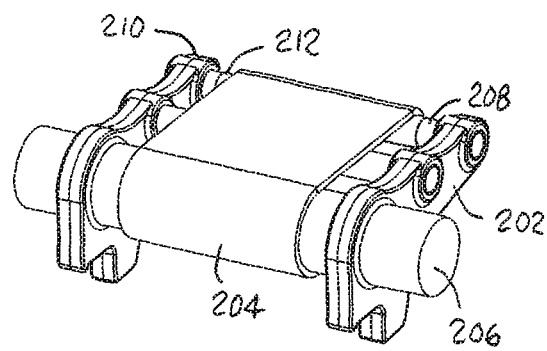
FIG. 17 is an axonometric view of a version of a carrier for a transfer assembly as in FIG. 9 using a flat drive belt.

In the version shown in FIG. 17, a carrier 202 uses a flat drive belt 204. The flat drive belt 204 is wrapped around the periphery of a rotatable shaft 206 and around a stationary, i.e., non-rotating, connecting pin 208, or bar, at the cantilevered tip end 210 of the carrier 202. One or more round belts could be used instead of the flat belt. Articles ride across the carrier 202 atop the drive surfaces provided by the flat belt 204. An optional bushing sleeve 212 on the connecting pin 208 provides a more durable, replaceable wear surface. So, in this optional version, the bushing 212 serves a wheel.

From these exemplary versions, it should be clear that the transfer assemblies can be realized in a variety of ways: with or without shaft wheels, with flat belts or round belts, with or without intermediate rows of idle wheels, and with or without grooved shafts, for example.

Although the invention has been described in some detail with respect to exemplary versions, other versions are possible. For example, the transfer assembly can be positioned along the side of a conveyor belt for side-on or side-off transfers. As another example, the rollers can be cylindrical without openings from the peripheries to their bores. Or the rollers can be helical in shape with plenty of open area to the bore for cleaning the rollers, shafts, and connecting pins. So, as these few examples suggest, the claims are not meant to be limited to the details of the described versions.

What is claimed is:

1. A transfer assembly for transferring articles off a conveyor, the transfer assembly comprising:
    a shaft;
    a drive coupled to the shaft to rotate the shaft;
    a carrier including:
        a pivot portion resting on the shaft to pivot freely about the shaft without enough engagement to rotate with the shaft;
        a cantilevered portion extending from the pivot portion to a distal tip;
        a drive surface at the tip for supporting transferring articles;
    wherein the shaft is coupled to the drive surface to advance the drive surface as the shaft is rotated by the drive.

2. A transfer assembly as in claim 1 wherein the carrier includes a wheel at the tip and a drive belt trained around the wheel and the shaft and rotated by the shaft.

3. A transfer assembly as in claim 2 wherein the wheel has a groove receiving the drive belt.

4. A transfer assembly as in claim 3 wherein the groove in the wheel is deep enough so that the drive belt is recessed radially inward of the outer periphery of the wheel and the wheel provides the drive surface for the articles.

5. A transfer assembly as in claim 3 wherein the groove in the wheel is shallow enough so that the drive belt extends radially outward of the outer periphery of the wheel and the drive belt provides the drive surface for the articles.

6. A transfer assembly as in claim 1 wherein the carrier includes a stationary bar at the tip and a drive belt trained around the wheel and the shaft and rotated by the shaft, wherein the drive belt provides the drive surface for the articles.

7. A transfer assembly as in claim 1 wherein the carrier includes a drive belt and wherein the shaft includes a groove receiving the drive belt.

8. A transfer assembly as in claim 1 wherein the carrier includes a first wheel mounted on the shaft for rotation with the shaft, a second wheel at the tip of the carrier, and a drive belt trained around the first wheel and the second wheel to rotate the second wheel as the shaft and first wheel rotate.

9. A conveyor system comprising a transfer assembly as in claim 1 and:
    a conveyor belt having an inner side and an outer conveying side and advancing at a belt speed;
    a reversing wheel engaging the inner side of the conveyor belt and rotating as the conveyor belt advances;
    a master pulley coupled to the reversing wheel to rotate with the reversing wheel;
    wherein the drive for the transfer assembly includes a slave pulley coupled to the shaft of the transfer assembly and rotated by the master pulley to advance the drive surface of the transfer assembly at a speed related to the belt speed.

10. A conveyor system as in claim 9 wherein drive surface advances at the belt speed.

11. A transfer assembly for transferring articles off a conveyor, the transfer assembly comprising:
    a pivot portion having a bore;
    a cantilevered portion extending from the pivot portion to a distal tip;
    a shaft extending through the bore and having a diameter less than the diameter of the bore and defining a pivot axis about which the first pivot portion and the first cantilevered portion are freely pivotable away from a home position when the tip is subjected to an upward force and back to the home position by gravity when the tip is not subjected to an upward force;

a first wheel mounted on the shaft in the pivot portion;

a second wheel rotatably mounted in the cantilevered portion to rotate about an axis parallel to the pivot axis;

a drive coupled to the shaft to rotate the shaft and the first wheel;

a drive belt trained around the first wheel and the second wheel so that the second wheel rotates with the first wheel.

12. A transfer assembly as in claim 11 wherein the diameter of the first wheel is greater than the diameter of the second wheel.

13. A transfer assembly as in claim 11 wherein the first wheel and the second wheel are cylindrical rollers with an outer periphery and wherein the drive belt is trained around the outer periphery of the first wheel and the outer periphery of the second wheel.

14. A transfer assembly as in claim 11 wherein the first wheel has a first portion with a first diameter $D_1$ and a second portion with a smaller diameter $d_1$ and wherein the second wheel has a first portion with a first diameter $D_2$ and a second portion with a smaller diameter $d_2$ and wherein the drive belt is trained around the second portions of the first and second wheels.

15. A transfer assembly as in claim 14 wherein $d_1/D_1=d_2/D_2$.

16. A transfer assembly as in claim 11 further comprising a plurality of first wheels mounted on the shaft.

17. A transfer assembly as in claim 16 wherein the cantilevered portion includes a plurality of pins extending parallel to the pivot axis and a plurality of second wheels rotatably mounted on the pins.

18. A transfer assembly as in claim 11 further comprising a third wheel disposed in the cantilevered portion between the first and second wheels.

19. A transfer assembly for transferring articles off a conveyor, the transfer assembly comprising:

a shaft defining a pivot axis;

a carrier freely pivotable about the shaft on the pivot axis over an angular pivot range;

a first wheel mounted on the shaft for rotation with the shaft;

a second wheel rotatably mounted in the frame to rotate on an axis parallel to the pivot axis;

a drive coupled to the shaft to rotate the shaft and the first wheel;

a drive belt trained around the first wheel and the second wheel so that the second wheel rotates with the first wheel.

20. A transfer assembly as in claim 19 wherein the carrier includes:

a first side rail and a second side rail;

a connecting pin connected between the first and second side rails so that the first and second side rails pivot together about the pivot axis;

wherein the second wheel rotates on the connecting pin.

* * * * *